(12) United States Patent
Halavais et al.

(10) Patent No.: US 7,660,729 B2
(45) Date of Patent: *Feb. 9, 2010

(54) SYSTEM AND METHOD FOR SELECTING AND RESERVING AIRLINE SEATS

(75) Inventors: Richard Arthur Halavais, Anaheim Hills, CA (US); Tony Cheng-Tong Chung, Diamond Bar, CA (US)

(73) Assignee: Ceats, Inc., Las Vegas ( * ) Notice: Subject to any disclaimer, the term of this patent is extended or adjusted under 35 U.S.C. 154(b) by 0 days.

This patent is subject to a terminal disclaimer.

(21) Appl. No.: 12/491,171

(22) Filed: Jun. 24, 2009

(65) Prior Publication Data

US 2009/0254384 A1   Oct. 8, 2009

Related U.S. Application Data

(63) Continuation of application No. 12/244,727, filed on Oct. 2, 2008, which is a continuation of application No. 09/295,577, filed on Apr. 22, 1999, now Pat. No. 7,454,361.

(51) Int. Cl.
G06Q 10/00 (2006.01)

(52) U.S. Cl. .......................................................... 705/5

(58) Field of Classification Search .................... 705/1, 705/5

See application file for complete search history.

(56) References Cited

U.S. PATENT DOCUMENTS

| 3,427,438 A | 2/1969 | Ruscher |
| 4,449,186 A | 5/1984 | Kelly et al. |
| 4,788,643 A | 11/1988 | Trippe |

(Continued)

FOREIGN PATENT DOCUMENTS

EP   0920207 A1   6/1999

(Continued)

OTHER PUBLICATIONS

Anderson, Jennifer, Ticket to Ride, Apr. 21, 1998, PC Magazine, v17, n8, p. 40(1).

(Continued)

*Primary Examiner*—John W Hayes
*Assistant Examiner*—Shannon S Saliard
(74) *Attorney, Agent, or Firm*—Knobbe, Martens, Olson & Bear LLP

(57) ABSTRACT

The present invention relates to a system and method for selecting and reserving airline seats. The system or method receives first data representing payment information over the network from a general purpose computer. The system or method also transmits second data to an application running on the general purpose computer, the second data including information descriptive of available individual seats on one or more airplanes, the second data processed by the application to generate a graphical user interface on the general purpose computer that comprises an interactive seating map representing individual seats on the one or more airplanes, the second data processed by the application to generate an additional display of information about selection of seats in response to a user interaction with the graphical user interface, the interaction being triggered when placing a mouse over a portion of the graphical user interface. In addition, the system or method receives from the general purpose computer third data representing one or more seats selected by one or more mouse clicks.

20 Claims, 30 Drawing Sheets

U.S. PATENT DOCUMENTS

| | | | |
|---|---|---|---|
| 4,794,530 A | 12/1988 | Yukiura et al. | |
| 4,931,932 A | 6/1990 | Dalnekoff et al. | |
| 4,974,252 A | 11/1990 | Osborne | |
| 4,984,156 A | 1/1991 | Mekata | |
| 4,992,647 A | 2/1991 | Konishi et al. | |
| 5,021,953 A | 6/1991 | Webber et al. | |
| 5,027,224 A | 6/1991 | Yamada | |
| 5,151,692 A | 9/1992 | Hirahara | |
| 5,237,499 A | 8/1993 | Garback | |
| 5,239,480 A | 8/1993 | Huegel | |
| 5,255,184 A | 10/1993 | Hornick et al. | |
| 5,270,921 A | 12/1993 | Hornick et al. | |
| 5,285,055 A | 2/1994 | Oonakahara et al. | |
| 5,311,425 A | 5/1994 | Inada | |
| 5,333,257 A | 7/1994 | Merrill et al. | |
| 5,408,417 A | 4/1995 | Wilder | |
| 5,500,938 A | 3/1996 | Cahill | |
| 5,581,461 A | 12/1996 | Coll | |
| 5,615,342 A | 3/1997 | Johnson | |
| 5,621,430 A | 4/1997 | Bricklin | |
| 5,668,592 A | 9/1997 | Spaulding, II et al. | |
| 5,680,152 A | 10/1997 | Bricklin | |
| 5,714,948 A * | 2/1998 | Farmakis et al. | 340/961 |
| 5,724,520 A | 3/1998 | Goheen | |
| 5,732,398 A | 3/1998 | Tagawa | |
| 5,754,654 A | 5/1998 | Hiroya et al. | |
| 5,769,269 A | 6/1998 | Peters | |
| 5,781,892 A | 7/1998 | Hunt et al. | |
| 5,797,126 A | 8/1998 | Helbling et al. | |
| 5,797,127 A | 8/1998 | Walker et al. | |
| 5,806,046 A | 9/1998 | Curran et al. | |
| 5,808,894 A | 9/1998 | Wiens et al. | |
| 5,832,451 A | 11/1998 | Flake et al. | |
| 5,832,454 A | 11/1998 | Jafri et al. | |
| 5,842,176 A | 11/1998 | Hunt et al. | |
| 5,855,006 A | 12/1998 | Huemoeller et al. | |
| 5,897,620 A | 4/1999 | Walker et al. | |
| 5,926,108 A | 7/1999 | Wicks et al. | |
| 5,926,798 A | 7/1999 | Carter | |
| 5,930,761 A | 7/1999 | O'Toole | |
| 5,930,769 A | 7/1999 | Rose | |
| 5,943,651 A | 8/1999 | Oosawa | |
| 5,948,040 A | 9/1999 | DeLorme et al. | |
| 5,974,406 A | 10/1999 | Bisdikian et al. | |
| 5,990,927 A | 11/1999 | Hendricks et al. | |
| 6,023,685 A | 2/2000 | Brett | |
| 6,070,149 A | 5/2000 | Tavor | |
| 6,085,169 A | 7/2000 | Walker et al. | |
| 6,085,976 A | 7/2000 | Sehr et al. | |
| 6,107,932 A | 8/2000 | Walker et al. | |
| 6,112,185 A | 8/2000 | Walker et al. | |
| 6,119,096 A | 9/2000 | Mann et al. | |
| 6,134,534 A | 10/2000 | Walker et al. | |
| 6,167,462 A | 12/2000 | Davis | |
| 6,223,166 B1 | 4/2001 | Kay | |
| 6,240,396 B1 | 5/2001 | Walker | |
| 6,249,767 B1 | 6/2001 | Okayama et al. | |
| 6,263,315 B1 | 7/2001 | Talluri | |
| 6,301,574 B1 | 10/2001 | Thomas | |
| 6,304,850 B1 | 10/2001 | Keller | |
| 6,380,959 B1 | 4/2002 | Wang et al. | |
| 6,418,413 B2 | 7/2002 | DeMarcken et al. | |
| 6,606,101 B1 | 8/2003 | Malamud | |
| 6,704,713 B1 | 3/2004 | Brett | |
| 6,824,057 B2 | 11/2004 | Rathus et al. | |
| 6,948,126 B2 | 9/2005 | Malamud et al. | |
| 6,975,856 B2 | 12/2005 | Ogasawara | |
| 6,999,936 B2 | 2/2006 | Sehr | |
| 7,010,533 B1 | 3/2006 | Kutsumi et al. | |
| 7,069,228 B1 | 6/2006 | Rose | |
| 7,114,179 B1 | 9/2006 | Ritter et al. | |
| 7,454,361 B1 | 11/2008 | Halavais | |
| 2001/0016825 A1 | 8/2001 | Pugliese et al. | |
| 2001/0043210 A1 | 11/2001 | Gilbert | |
| 2002/0156661 A1 | 10/2002 | Jones et al. | |
| 2002/0178034 A1 | 11/2002 | Gardner et al. | |
| 2004/0107439 A1 | 6/2004 | Hassell et al. | |
| 2005/0144115 A1 | 6/2005 | Brett | |
| 2005/0199713 A1 | 9/2005 | Rathus et al. | |
| 2007/0027794 A1 | 2/2007 | Brett | |
| 2007/0027798 A1 | 2/2007 | Brett | |
| 2007/0033131 A1 | 2/2007 | Brett | |
| 2007/0038582 A1 | 2/2007 | Brett | |
| 2007/0124232 A1 | 5/2007 | Brett | |

FOREIGN PATENT DOCUMENTS

| | | |
|---|---|---|
| EP | 1868153 A2 | 12/2007 |
| GB | 2366403 A | 8/2000 |
| JP | 62-069363 | 3/1987 |
| JP | 63-183666 | 11/1988 |
| JP | 05-324689 | 12/1993 |
| JP | 07-307932 | 11/1995 |
| JP | 08-191281 | 7/1996 |
| JP | 09-044570 | 2/1997 |
| JP | 19957311911 | 6/1997 |
| JP | 09-319897 | 12/1997 |
| JP | 10-091818 | 4/1998 |
| JP | 10-105599 | 4/1998 |
| JP | 10-289281 | 10/1998 |
| JP | 10-293796 | 11/1998 |
| JP | 62-132491 | 12/1998 |
| WO | WO9527949 | 10/1995 |
| WO | WO9814903 | 4/1998 |
| WO | WO9960489 | 11/1999 |
| WO | WO 0028484 | 5/2000 |
| WO | WO0050982 | 8/2000 |

OTHER PUBLICATIONS

Printout of Travelocity.com Seat Map archived Dec. 12, 1998 from http://web.archive.org/web/19990428171540/www2.travelocity.com/ttools/seatmap.html downloaded Sep. 23, 2008.

Swanson, James, Mouseover Mappings, Winter 1997 Journal of the North American Cartographic Information Society.

Kinetix Adds Powerful 3D VRML Capabilities to Hyperwire Web Title Authoring Software, Business Wire, Jul. 15, 1996.

Business Wire, ElectroTix Offers New Visual Approach to Selling Tickets On Internet, May 28, 1998.

*Kompetenzen im Bereich >>Network Computing<<*, Fraunhofer Institut Software- und Systemtechnik ISST, Jahresbericht 1996, pp. 36-37.

*Tendenz: Einfach zu bedienende Gerate ans Internet hangen*, Computerwoche 35/1997, Aug. 29, 1997.

Exciting New Features Now Available on Microsoft Expedia, May 5, 1997, PR Newswire.

W3C, HTML 4.01 Specification, Aug. 24, 2009, <URL: http://www.w3.org/TR/1999/PR-html40-19990824/html40.pdf>.

Ackerman, Jerry, No Ticket No Problem: Ticketless Travel Heralds a Computer-Driven Revolution in the Travel Industry, Boston Globe, Jun. 4, 1995.

Chester, R., Tips for Net Explorer, Courier Mail, Jan. 20, 1998, pp. 15, Queensland, Australia.

Christel, Michael and Martin, David, Information Visualization Within a Digital Video Library, Journal of Intelligent Information Systems, 1998, vol. 11, pp. 235-257.

Chu, Larry and Chan, Bryan, Evolution of web site design: implications for medical education on the internet, Computers in Biology and Medicine, 1998, vol. 28, pp. 459-472.

Feldman, Joan, Battle of the mouse clicks, Air Transport World, Jan. 1999, pp. 50-51.

Flint, Perry, Web of Ambivalence, Air Transport World, Apr. 1998, pp. 31-36.

Forsyth, Gordon, Chipping In, AirCargoWorld, Oct. 1998, pp. 38-43.

Hunter Kevil, L et al., Reviews: An Electronic Companion to Statistics. Paper book with CD-ROM in pocket, Electronic Resources Review, 1998, vol. 2, Issue 8, pp. 98-99, San Francisco, U.S.

Kuom, Matthias and Oertel, Britta, Virtual travel agencies, Netnomics, 1999, vol. 1, pp. 225-235.

Levere, Jane, On-Line A new web challenger, Airline Business, Nov. 1998, pp. 49.

Levere, Jane, Online Review: Don't just look, book!, Airline Business, Nov. 1997, pp. 79.

Levere, Jane, Internet Pursuit Heats Up, Airline Business, Dec. 1998, pp. 16.

Levere, Jane, Low fares capture more web sales, Airline Business, Jan. 1998, pp. 62.

Levere, Jane, United's answer to Travelocity, Airline Business, Sep. 1998, pp. 134.

Lewis, Torch, Fellow Viagrans, Unite!, Business & Commercial Aviation, Jan. 1999, pp. 112.

Lin, Xia et al., Visu Interactions with Web Database Content, {On-line} Available: http://research.cis.drexel.edu/mesh/meshPaper1.html, 1995.

MCI Now the MCI Center is Just a Mouse Click Away; Washington, D.C.'s State-of-the-Art Arena Launches New Website, www.mcicenter.com, PR Newswire, Jul. 13, 1998, pp. 1.

Mills, Tim et al., Providing world wide access to historical sources, Computer Networks and ISDN Systems, 1997, vol. 29, pp. 1317-1325.

Ndumu, DT et al., Towards desktop personal travel agents, BT Technol J, Jul. 1998, vol. 16, Issue 3, pp. 69-78.

Reibman, Greg, Boston's Don Law Launches Ticketing Firm; Keeps Ticketmaster From Top Area Venues, Billboard, Feb. 3, 1996.

SABRE Group, New SABRE BTS Release Speeds Travel Process for Corporate Travelers; Automatic Flight Upgrades, Visual Seat Maps Put Travelers in Control, PR Newswire, Mar. 2, 1998.

Thing L., The Web: towards 2001, Trends in Ecology and Evolution, 1997, vol. 12, Supplement, pp. 10-11.

Thompson, Linda, Travel Smart, Waikato Times, Jun. 1, 1998.

Trask, Simon, Beatnik takes to the information superhighway, ProSound News Europe, Mar. 1997, pp. 32.

Walker, David, A welcoming site; Web Mechanic, Sydney Morning Herald, Oct. 6, 1998, Issue Late edition, pp. 9, Australia.

Wise, A, Interactive learning aided by JavaScript, ALT-J, 1999, vol. 7, Issue 2, pp. 46-56.

Feb. 2, 2001 Written Opinion of the International Preliminary Searching Authority in International App. No. PCT/US00/10686 filed Apr. 21, 2000.

Oct. 9, 2002 Office Action in U.S. Appl. No. 09/533,213, filed Apr. 20, 2000.

Feb. 24, 2009 Office Action in U.S. Appl. No. 12/329,533, filed Dec. 5, 2008.

Apr. 2, 2009 Office Action in U.S. Appl. No. 12/244,727, filed Oct. 2, 2008.

Past, present, and future office actions, amendments, arguments, and other relevant documents or materials in the file history of U.S. Appl. No. 09/553,213, filed Apr. 20, 2000, entitled Individual Seat Selection Ticketing and Reservation System, now abandoned.

Past, present, and future office actions, amendments, arguments, and other relevant documents or materials in the file history of application Serial No. PCT/US00/10686, filed Apr. 21, 2000, entitled Individual Seat Selection Ticketing and Reservation System, now abandoned.

Past, present, and future office actions, amendments, arguments, and other relevant documents or materials in the file history of co-pending U.S. Appl. No. 09/295,577, filed Apr. 22, 1999, entitled Individual Seat Selection Ticketing and Reservation System, which issued on Nov. 18, 2008 as U.S. Pat. No. 7454361.

Past, present, and future office actions, amendments, arguments, and other relevant documents or materials in the file history of co-pending U.S. Appl. No. 12/244,727, filed Oct. 2, 2008, entitled Individual Seat Selection Ticketing and Reservation System.

Past, present, and future office actions, amendments, arguments, and other relevant documents or materials in the file history of co-pending U.S. Appl. No. 12/329,507, filed Dec. 5, 2008, entitled Individual Seat Selection Ticketing and Reservation System.

Past, present, and future office actions, amendments, arguments, and other relevant documents or materials in the file history of co-pending U.S. Appl. No. 12/329,512, filed Dec. 5, 2008, entitled System and Method for Maintaining Coherency of Data Entries.

Past, present, and future office actions, amendments, arguments, and other relevant documents or materials in the file history of co-pending U.S. Appl. No. 12/329,531, filed Dec. 5, 2008, entitled Dynamic Interactive User Interface.

Past, present, and future office actions, amendments, arguments, and other relevant documents or materials in the file history of co-pending U.S. Appl. No. 12/329,533, filed Dec. 5, 2008, entitled System and Method for Selecting and Reserving Sets of Seats.

Past, present, and future office actions, amendments, arguments, and other relevant documents or materials in the file history of co-pending U.S. Appl. No. 12/333,265, filed Dec. 11, 2008, entitled System and Method for Selecting and Reserving Airline Seats.

Past, present, and future office actions, amendments, arguments, and other relevant documents or materials in the file history of co-pending U.S. Appl. No. 12/429,525, filed Apr. 24, 2009, entitled System and Method for Selecting and Reserving Time Slots for an Appointment.

Past, present, and future office actions, amendments, arguments, and other relevant documents or materials in the file history of co-pending U.S. Appl. No. 12/429,631, filed Apr. 24, 2009, entitled System and Method for Selecting and Reserving Rooms at a Venue.

Past, present, and future office actions, amendments, arguments, and other relevant documents or materials in the file history of co-pending U.S. Appl. No. 12/479,598, filed Jun. 5, 2009, entitled System and Method for Selecting and Reserving Airline Seats.

Past, present, and future office actions, amendments, arguments, and other relevant documents or materials in the file history of co-pending U.S. Appl. No. 12/479,635, filed Jun. 5, 2009, entitled System and Method for Displaying Airline Seats.

Past, present, and future office actions, amendments, arguments, and other relevant documents or materials in the file history of co-pending U.S. Appl. No. 12/488,497, filed Jun. 19, 2009, entitled System and Method for Selecting and Reserving Seats Using a Touch Screen Device.

Past, present, and future office actions, amendments, arguments, and other relevant documents or materials in the file history of co-pending U.S. Appl. No. 12/479,601, filed Jun. 5, 2009, entitled System and Method for Selecting and Reserving Airline Seats.

Past, present, and future office actions, amendments, arguments, and other relevant documents or materials in the file history of co-pending U.S. Appl. No. 12/491,182, filed Jun. 24, 2009, entitled System and Method for Displaying Airlines Seats.

Watanabe, *Basic Knowledge of Railway Electrical Systems* (16), Railway and Electrical Engineering, vol. 10, No. 3, Article Serial No. 0016, Mar. 1999.

* cited by examiner

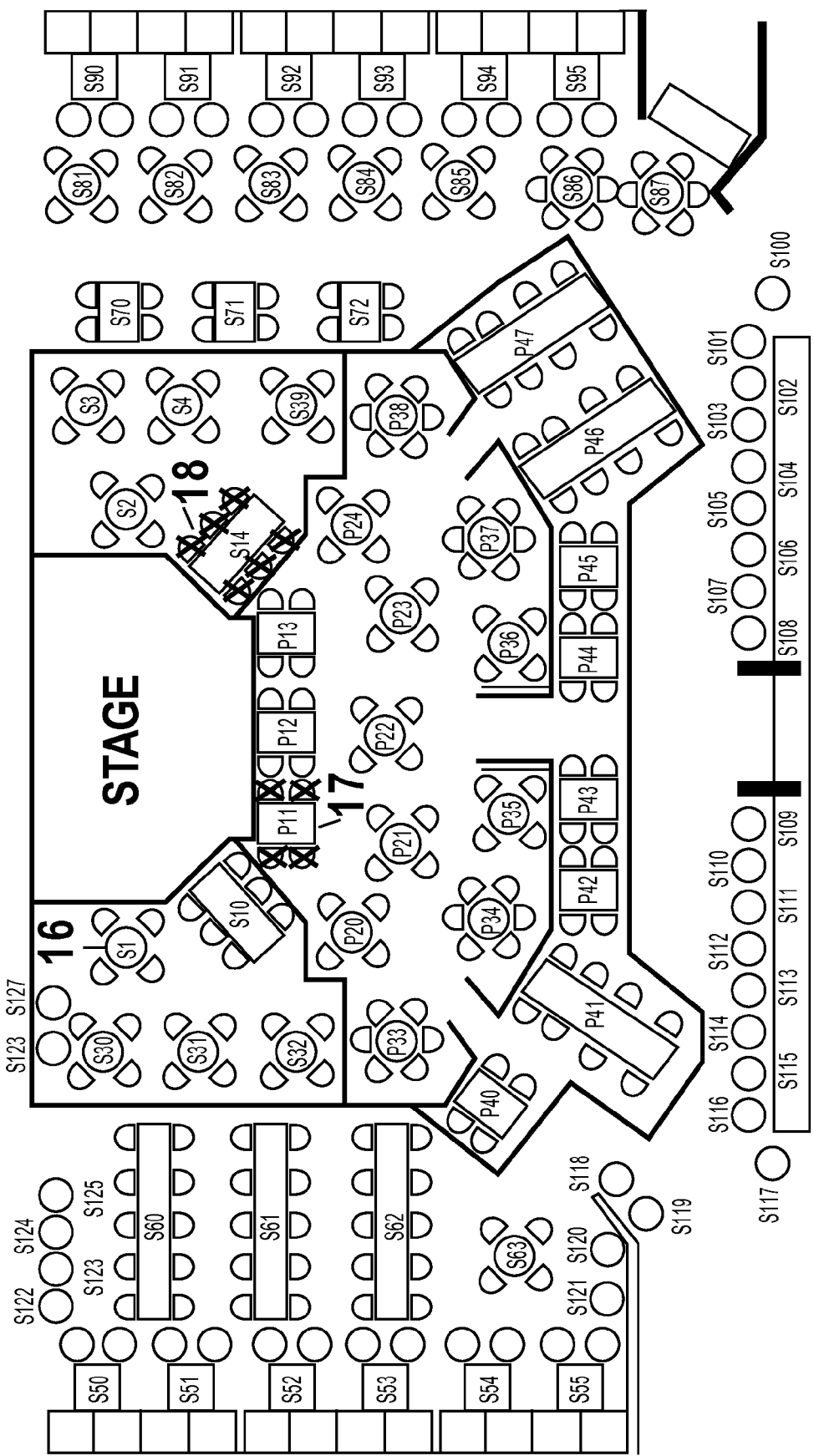

Begin Program

FIG. 5

```
<Markup language>

<REM --- Imports the file "datasource.inc" which creates variable "datasource" which is
used to tell markup language datasource to connect to.                    --->

<INCLUDE NAME="database\datasource.inc">

<REM--- In case a database or other type of error occurs, this display the error message. --->

<ERROR>

<FONT FACE='Verdana, Arial" SIZE="+1"><B>An Error Has Occurred</B></FONT><P> <FONT
FACE="Verdana, Arial" SIZE="-1"><B>Error Message = :i_errortext </B></FONT><P>

<FONT FACE="Verdana, Arial" SIZE="-1"><B>database Error =
:i_databaseerrortext</B></FONT><P>

<FONT FACE="Verdana, Arial" SIZE="-1"><B>database Error = i_databaseerrorstmt
</B></FONT><P>

</ERROR>

<REM --- Begin normal markup language here                  --->

<markup language>

<HEAD>

<TITLE>Ticketing & Reservation System</TITLE>

</HEAD>

<BODY BACKGROUND="images/background.jpg" TEXT="#000000" LINK="#006666"
VLINK="#006666">

<CENTER>

<IMG SRC="images/masthead_concerts.gif" HEIGHT=60 WIDTH=280><P>
```

```
<FONT FACE="Verdana,Arial". SIZE=-1><B>To begin reserving your seat(s), please select
the concert date/time you wish to attend next to the performer you want to
see:</B></FONT>
<TABLE BORDER=0 CELLSPACING=5 CELLPADDING=5>
<REM --- Begin database query to retrieve all performances that is      --->
<REM --- currently available. Will loop until all available             --->
<REM --- performing artists and their performances are listed.          --->
<REM--- Part of the return from the query are the links that will       --->
<REM --- take you to the next step of the reservation.                  --->
        <database DBNAME=":datasource"
        database="SELECT id, name, picture, sequence
        FROM category
        WHERE active=1 AND parent=-1
        ORDER BY sequence"
        ALIAS="concert">
        <databaseFETCH ALIAS="concert">
        <WHILE NOTALIAS=i_databaseempty>
        <TR>
        <TO COLSPAN=2>
        <FONT FACE="Verdana,Arial" SIZE=+1><B>:concert_name</B></FONT>
        </TD></TR><TR><TD VALIGN="top">
        <img src=imagesLconcert_picture align=top border="1">
        </TD><TD>
        <Markup language DBNAME=":datasource"
                database="SELECT id, name, date, time
                FROM category
                WHERE active=1 AND parent=rconcert_id
                ORDER BY date, time"
                OUTPUT="<FONT FACE="Verdana,Arial" SIZE=-1><B>
```

```
            <A HREF='Reserve1.ihtml?&id=;1'>:2</A>
            </B></FONT><p>">
        </TD></TR><TR><TD COLSPAN=2><HR></TD></TR>
        <databaseFETCH ALIAS="concert">
        </WHILE ALIAS=i_databaseempty>
    </database ALIAS="concert">
    <'TABLE>
    </BODY>
    </markup language>
processing then passes to:
    <Markup language>
    <REM--- Imports the file "datasource.inc" which creates the        --->
    <REM --- variable "datasource" which is used to tell Markup language which        --->
    <REM --- database datasource to connect to.            --->
    <INCLUDE NAME="database\datasource.inc">
    <REM In case a database or other type of error occurs, this will display the error message. >
    <ERROR>
    <FONT FACE="Verdana,Arial" SIZE="+1"><B>An Error Has Occurred</B></FONT><P>
    <FONT FACE="Verdana,Arial" SIZE="-1"><B>Error Message =
    :i_errortext</B></FONT><P>
    <FONT FACE="Verdana,Arial" SIZE="-1"><B>database Error =
    :idatabaseerrortext</B></FONT><P>
    <FONT FACE="Verdana,Arial" SIZE="-1"><B>database Error =
    :i_databaseerrorstmt</B></FONT><P>
    </ERROR>
    <REM --- Begin normal markup language here --- >
    <markup language>
    <HEAD>
    <TITLE>Ticketing & Reservation System - Select Seat(s)</TITLE>
```

FIG. 5 (CONT.)

```
</HEAD>
<REM --- All seats clicked will pass its information to a input box, "newseats". When done,
the information will be passed to "process.ihtml" and be processed by "reserve2.ihtml". --- >
<REM --- This code allows the ability to select multiple seats before proceeding to the next
step of reservation process. Other features include listing the selected seats in the
"number" text box to show the seats that has been clicked. This script also alters the button
text to be grammatically correct. --- >
<SCRIPT LANGUAGE="JavaScript">
<!--
function selectseat(idnum, seatnum)
{
reserved = document. seats. number. value;
if (reserved == '"')
{
document. seats. newseats. value = "<Markup language DBNAME=:"+"datasource
database='INSERT INTO basket (custid, pid, qty) VALUES (:"+"custid, "+idnum+",
1)'><database DBNAME=:"+"datasource database='SELECT cost FROM products WHERE
id="+idnum+"'><databaseFETCH><iEQ NAME='ticketprice' VALUE=:"+"1></database><iEQ
NAME='total' VALUE=<iEVAL EXPR=':"+"ticketprice + :"+"total' PREC='2'>><Markup
language DBNAME=:"+" datasource database='INSERT INTO orderdetail (pid, aid, qty, sell)
VALUES ("+idnum+", :"+"oid, 1, :"+"ticketprice)'>";
document.seats.number.value = seatnum;
document. seats. button1. value = "Reserve Seat";
document.seats.button2.value = "Clear Choice";
}
else
{
document. seats.newseats. value += "<Markup language DBNAME=:"+"datasource
database='INSERT INTO basket (custid, pid, qty) VALUES (:"+"custid, "+idnum+",
```

1)'><database DBNAME=:"+"datasource database='SELECT cost FROM products WHERE id="idnum+'"><databaseFETCH><iEQ NAME='ticketprice' VALUE=:"+"1></database><IEQ NAME='total' VALUE=<iEVAL EXPR=':"+"ticketprice + :"+"total' PREC='2'>><Markup language DBNAME=:"+"datasource database='INSERT INTO orderdetail (pid, old, qty, sell) VALUES ("+idnum+", :"+"oid, 1, :"+"ticketprice)'>";

document.seats.number.value = reserved+", "+seatnum;

document.seats.button1.value = "Reserve Seats";

document.seats.button2.value = "Clear Choices";

}

} function clear()

{ document.seats.newseats.value = '";

}

//-->

</SCRIPT>

<BODY BACKGROUND="images/background.jpg" TEXT="#000000" LINK="#006666" VLINK="#006666">

<REM --- Begin database query to retrieve the last id number from table "orderdetail" for the purpose of creating a new instance of the stage image whenever a new order has occurred. This will prevent the browser from displaying an old floor image from its cache as a different image name is called every time the file is run. --- >

<database DBNAME=":datasource"

database="SELECT max(id)

FROM orderdetail">

<databaseFETCH>

<iEQ NAME="imagenum" VALUE=:1>

<databaseFETCH>

</database>

FIG. 5 (CONT.)

```
<iEQ NAME="imagetype" VALUE=".jpg">
<CENTER>
<TABLE BGCOLOR=40000001 BORDER=0 CELLPADDING=5 CELLSPACING=0
WIDTH=500>
<TR><TD><CENTER>
<FONT FACE="Verdana,Arial" SIZE=+1 COLOR='#FFFFFF'><B>
Concert Reservation System
</B></FONT>
</CENTER>
</TD></TR></TABLE></CENTER><p>
<REM - Loads the core image that will be dynamically altered for use as the image map. - >
<iIMAGEFROMFILE NAME="stage" FILENAME="images/stage.jpg" TYPE="jpeg">
<MAP NAME="stage" BORDER=0>
<REM --- Begin database query to retrieve all seat information for the image map
"stage". Will loop until all available seat information for this particular performance is listed.   --->
<REM --- The return query will be used only if the "active" attribute of that particular seat is
marked "true" or "1".   --- >
<REM --- If active, the seat's information, including image map coordinates will be displayed.
Otherwise, the seat on the image map will be x'd out according to the x and y coordinates
associated with it.          --->
<database DBNAME=":datasource"
database="SELECT id, active, x, y, shape, corrds, name, mouseout, mouseover1,
mouseover2, mouseover3
        FROM products
        WHERE catid=:id">
        <databaseFETCH>
        <iWHILE NOTALIAS=i_databaseempty>
        <iEQ NAME="active" VALUE=:2>
        <iCASE ALIAS="active" VALUE=1>
```

FIG. 5 (CONT.)

```
<AREA SHAPE=":5" COORDS=":6" HREF="javascript:selectseat(':1,':7')" ALT="Seat # :7"
OnMouseOut=:8 OnMouseOver=:9 :7 :10 :7 :11 >
        </iCASE ALIAS="active">
        <iCASE ALIAS="active" VALUE=0>
        <iIMAGETEXT NAME="stage" TEXT="X" X=:3 Y=:4 COLOR="red">
        </iCASE ALIAS="active">
        <databaseFETCH>
        </iWHILE ALIAS=i_databaseempty>
</database>
</MAP>
<CENTER>
<FONT FACE="Verdana,Arial" SIZE="-1"><B>
Click on the seat you wish to reserve.
</B></FONT>
<TABLE BORDER=1 CELLPADDING=0 CELLSPACING=0>
<TR><TD>
<REM --- Converts the dynamically generated image, "stage", into a web friendly image type -
"jpeg".        --->
<iIMAGEWRITE NAME="stage" FILENAME="images/ch_stage-:id-:imagenum:"imagetype"
TYPE="jpeg" QUALITY="30">
<REM --- Deletes the temporary image "stage" as it is no longer needed. --- >
<iIMAGEDESTROY NAME="stage">
<IMG SRC="images/legend.jpg" BORDER=0 HEIGHT=20 WIDTH=584><BR>
<IMG SRC="images/ch_stage-:id-imagenum:imagetype" BORDER=0 USEMAP="#stage"
HEIGHT=315 WIDTH=584>
</CENTER>
</TD></TR></TABLE>
<FONT FACE='Verdana,Arial' SIZE=-1><B>
An "X" denotes a seat that has already been taken.
```

FIG. 5 (CONT.)

```
</B></FONT>
<FORM NAME="seats" ACTION="process.ihtml" METHOD="post">
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1>
<TR><TD><CENTER>
<FONT FACE='Verdana,Arial' SIZE=-1><B>
Your mouse is over seat#: <INPUT TYPE="text" NAME="seatnum" SIZE=5>
</B></FONT></CENTER>
</TD></TR><TR><TD><CENTER>
<FONT FACE='Verdana,Arial' SIZE=-1><B>
Selected Seats:<BR><INPUT TYPE="text" NAME="number" SIZE=40>
<BR>
<INPUT TYPE="hidden" NAME="newseats" SIZE=50>
<INPUT TYPE="submit" NAME="button1" VALUE="Reserve Seat"> <INPUT
TYPE="reset" NAME="button2" VALUE="Clear Choice" onClick="clear()">
</B></FONT>
</CENTER>
</TD></TR></TABLE></TD></TR></TABLE></CENTER>
</FORM></CENTER></BODY>
</markup language>
``` which then passes to a template:

```
<Markup language>
<REM --- Imports the file "datasource.inc" which creates the variable "datasource" which is
used to tell Markup language which ODBC datasource to connect to.
<iINCLUDE NAME="database\datasource.inc">
<REM --- In case a database or other type of error occurs, this will display the error
message. - >
```

FIG. 5
(CONT.)

```
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:i_databaseerrortext</B></FONT><P>
<FONT FACE="Verdana,Arial" SIZE="-1 "><B>database Error =
:i_databaseerrorstmt</B></FONT><P>
</ERROR>
<REM--- Copy a preformatted file, "empty.ihtml" into a new file,    --->
<REM --- "reserve2.ihtml".                                           --->
<iCOPYFILE SRC="empty.ihtml" DST="reserve2.ihtml>
<REM --- Appends the information passed from "reseve1.ihtml" to "reserve2.ihtml" for
process. Other html information is also passed.    --->
<iFILE NAME="reserve2.ihtml" DATA=":newseats" OP="append">
<iFILE NAME="reserve2.ihtml" DATA="<INPUT TYPE='hidden' NAME='total'
VALUE=:total>" OP="append">
<iFILE NAME="reserve2.ihtml" DATA="</FORM>" OP="append">
<iFILE NAME="reserve2.ihtml" DATA="</CENTER>" OP="append">
<iFILE NAME="reserve2.ihtml" DATA="<P>" OP="append">
<iFILE NAME="reserve2.ihtml" DATA="</BODY>" OP="append">
<iFILE NAME="reserve2.ihtml" DATA="</markup language>" OP="append">
<REM --- Once the information is appended into "reserve2.ihtml", it will be automatically
push the page "reserve2.ihtml" to the browser.    --->
<iREDIR URL="reserve2.ihtml">
``` which then combines information and passes to:

```
<Markup language>
<REM --- Imports the file "datasource.inc" which creates the variable "datasource" which is
used to tell Markup language which ODBC datasource to connect to.    --->
```

FIG. 5
(CONT.)

```
<!INCLUDE NAME="database\datasource.inc">
<REM --- In case a database or other type of error occurs, this will display the error message. -->
<ERROR>
<FONT FACE="Verdana,Arial" SIZE="+1"><B>An Error Has Occurred</B></FONT><P>
<FONT FACE="Verdana,Arial" SIZE="-1"><B>Error Message = :i_errortext</B></FONT><P>
<FONT FACE="Verdana,Arial" SIZE="-1"><B>database Error = :idatabaseerrortext</B></FONT><P>
<FONT FACE="Verdana,Arial" SIZE="-1"><B>database Error = :i_databaseerrorstmt</B></FONT><P>
</ERROR>
<REM --- Copy a preformatted file, "empty.ihtml" into a new file, "reserve2.ihtml".  --->
<!COPYFILE SRC="empty.ihtml" DST="reserve2.ihtmr>
<REM Appends the information passed from "reseve1.ihtml" to "reserve2.ihtml" for process. Other html information is also passed. --- >
<iFILE NAME="reserve2.ihtml" DATA=":newseats" OP="append">
<iFILE NAME="reserve2.ihtml" DATA="<INPUT TYPE='hidden' NAME='total VALUE=:total>" OP="append">
<iFILE NAME="reserve2.ihtml" DATA="</FORM>" OP="append">
<iFILE NAME="reserve2.ihtml" DATA="</CENTER>" OP="append">
<iFILE NAME="reserve2.ihtml" DATA="<P>" OP="append">
<iFILE NAME="reserve2.ihtml" DATA="</BODY>" OP="append">
<iFILE NAME="reserve2.ihtml" DATA="</markup language>" OP="append">
<REM --- Once the information is appended into "reserve2.ihtml", it will be automatically push the page "reserve2.ihtml" to the browser.
<!REDIR URL="reserve2.ihtml">
then (takes all information from index & reserve one and conbines it to with the information in empty) then passes to:
```

```
<!Markup language>
<REM --- Imports the file "datasource.inc" which creates the variable "datasource" which is
used to tell Markup language which ODBC datasource to connect to. --- >
<iINCLUDE NAME="database\datasource.inc">
<REM -- In case a database or other type of error occurs, this will display the error
message. -- >
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:i_databaseerrortext</B></FONT><P>
<FONT FACE="Verdana,Arial" SIZE="-1"><B>database Error =
i_databaseerrorstmt</B></FONT><P>
</ERROR>
<REM --- Begin normal markup language here              --->
<markup language>
<HEAD>
<TITLE>Ticketing & Reservation System - Customer Information</TITLE>
</HEAD>
<BODY BACKGROUND="images/background.jpg" TEXT="#000000" LINK="#006666"
VLINK="#006666">
<REM-------Get Customer Info------->
<CENTER>
<TABLE BGCOLOR='#000000' BORDER=0 CELLPADDING=5 CELLSPACING=0
WIDTH=500>
<TR><TD><CENTER>
<FONT FACE='Verdana,Arial' SIZE=+1 COLOR='#FFFFFF'><B>
Ticketing & Reservation System
```

FIG. 5 (CONT.)

```
</B></FONT>
</CENTER>
</TD></TR>
</TABLE><p>
<FORM ACTION=reserve3.ihtml METHOD=POST>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1>
        <TR>
        <TD COLSPAN=2><CENTER><FONT FACE='Verdana,Arial' SIZE=-1><B>CUSTOMER INFORMATION</CENTER></TD>
        </TR><TR>
        <TD><FONT FACE='Verdana,Arial' SIZE=-1><B>Name as appear on CC</B></FONT></TD>
        <TD><FONT FACE='Verdana,Arial' SIZE=-1><B><INPUT TYPE="text" NAME="name" MAXLENGTH=50 SIZE=40></B></FONT></TD>
        </TR><TR>
        <TD><FONT FACE='Verdana,Arial' SIZE=-1><B>Phone</B></FONT></TD>
        <TD><FONT FACE='Verdana,Arial' SIZE=-1><B><INPUT TYPE="text" NAME="phone" MAXLENGTH=50 SIZE=12></B></FONT></TD>
        </TR><TR>
        <TD><FONT FACE='Verdana,Arial' SIZE=-1><B>Email</B></FONT></TD>
        <TD><FONT FACE='Verdana,Arial' SIZE=-1><B><INPUT TYPE="text" NAME="email" MAXLENGTH=50 SIZE=40></B></FONT></TD>
        </TR><TR>
        <TD><FONT FACE='Verdana,Arial' SIZE=-1><B>CC Number</B></FONT></TD>
        <TD><FONT FACE='Verdana,Arial' SIZE=-1><B><INPUT TYPE="text" NAME="ccnum" MAXLENGTH=50 SIZE=40></B></FONT></TD>
        </TR><TR>
```

FIG. 5 (CONT.)

```
          <TD><FONT FACE='Verdana,Arial' SIZE=-1><B>Expiration
(MM/YY)</B></FONT></TD>
          <TD><FONT FACE='Verdana,Arial' SIZE=-1><B>Month <INPUT TYPE="text"
NAME="ccmexp" MAXLENGTH=50 SIZE=2> / Year <INPUT TYPE="text" NAME="ccyexp"
MAXLENGTH=50 SIZE=2> ... example: 12/99</B></FONT></TD>
          </TR><TR>
          <TD COLSPAN=2>
          <CENTER>
          <FONT FACE='Verdana,Arial' SIZE=-1><B>
          <INPUT TYPE="submit" VALUE="Reserve Seats">
          <BR>
          <INPUT TYPE="reset" VALUE="Clear Choices">
          </B></FONT>
          </CENTER>
          </TD></TR>
</TABLE>
</TD></TR></TABLE>
<iEQ NAME="total" VALUE=0>
<iEQ NAME="date" VALUE='<iDATE>'>
<REM --- Begin database command to insert a new customer profile into the database. This
step is primarily for the purpose of obtaining a new customer id to associate this transaction.
The customer's ip and captured and inserted into a new record in the "customers" table.
The marker, "new" is flagged "true" for the attrieval of the new id. Once the new customer id
is captured, the marker "new" is turned off.                              --->
<Markup language DBNAME=:datasource
          database="INSERT INTO customers (ip, new)
          VALUES (':i_ip',1)">
<database DBNAME=:datasource
          database="SELECT id
```

FIG. 5
(CONT.)

```
        FROM customers
        WHERE new=1">
        <databaseFETCH>
        <iEQ NAME="custid" VALUE=:1>
</database>
<Markup language DBNAME=:datasource
        database="UPDATE customers
        SET new=0
        WHERE id=:custid">
<REM --- Begin database command to insert a new reservation into the database. This step
is primarily for the purpose of creating a new reservation record, flagged with the newly
obtained customer id, so that the transaction information may be processed in
"resere3.ihtml".          --->
<Markup language DBNAME=:datasource
        database="INSERT INTO orders (orderdate, approvalcode, receiptnum, totalcharge,
custid)
        VALUES (':date','0000', '0000', :total, :custid)"
FAILURE="The order could not be processed at this time due to technical difficulties.">
<REM --- Begin database command to obtain the reservation id that was just created. This
information, coupled with the customer id, will be used to identify this particular transaction
in the database and be updated in "resere3.ihtml"       --->
        <database DBNAME=:datasource
        database="SELECT max(id)
        FROM orders">
        <databaseFETCH>
        <iEQ NAME="oid" VALUE=:1>
</database>
        <INPUT TYPE="hidden" NAME="reserve" VALUE="receipt">
        <INPUT TYPE="hidden" NAME=custid VALUE=:custid>
```

FIG. 5 (CONT.)

```
<INPUT TYPE="hidden" NAME=phone VALUE=:phone>
<INPUT TYPE="hidden" NAME=email VALUE=:email>
<INPUT TYPE="hidden" NAME=oid VALUE=:oid>
<Markup language DBNAME=:datasource database='INSERT INTO basket (custid, pid, qty)
VALUES (:custid, 6431, 1)'><database DBNAME=:datasource database='SELECT cost
FROM products WHERE id=6431'><databaseFETCH><iEQ NAME='ticketprice'
VALUE=:1></database><iEQ NAME='total' VALUE=<iEVAL EXPR=':ticketprice + :total'
PREC='2'>><Markup language DBNAME=:datasource database='INSERT INTO orderdetail
(pid, oid, qty, sell) VALUES (6431, :oid, 1, :ticketprice)'><Markup language
DBNAME=:datasource database='INSERT INTO basket (custid, pid, qty) VALUES (:custid,
6428, 1)'><database DBNAME=:datasource database='SELECT cost FROM products
WHERE id=6428'><databaseFETCH><iEQ NAME='ticketprice'
VALUE=:1></database><iEQ NAME='total' VALUE=<iEVAL EXPR=':ticketprice + :total'
PREC='2'>><Markup language DBNAME=:datasource database='INSERT INTO orderdetail
(pid, aid, qty, sell) VALUES (6428, :oid, 1, :ticketprice)'><Markup language
DBNAME=:datasource database='INSERT INTO basket (custid, pid, qty) VALUES (:custid,
6429, 1)'><database DBNAME=:datasource database='SELECT cost FROM products
WHERE id=6429'><databaseFETCH><EQ NAME='ticketprice'
VALUE=:1></database><iEQ NAME='total' VALUE=<iEVAL EXPR=':ticketprice + :total'
PREC='2'>><Markup language DBNAME=:datasource database='INSERT INTO orderdetail
(pid, oid, qty, sell) VALUES (6429, :oid, 1, :ticketprice)'><Markup language
DBNAME=:datasource database='INSERT INTO basket (custid, pid, qty) VALUES (:custid,
6430, 1)'><database DBNAME=:datasource database='SELECT cost FROM products
WHERE id=6430'><databaseFETCH><iEQ NAME='ticketprice'
VALUE=:1></database><iEQ NAME='total' VALUE=<iEVAL EXPR=':ticketprice + :total'
PREC='2'>><Markup language DBNAME=:datasource database='INSERT INTO orderdetail
(pid, aid, qty, sell) VALUES (6430, :oid, 1, :ticketprice)'><INPUT TYPE='hidden'
NAME='total' VALUE=:total></FORM></CENTER><P></BODY></markup language>
``` takes in credit card information and passes to:

FIG. 5 (CONT.)

```
<!Markup language>
<REM --- Imports the file "datasource.inc" which creates the variable "datasource" which
is used to tell Markup language which ODBC datasource to connect to.
<iINCLUDE NAME="database\datasource.inc">
<REM -- In case a database or other type of error occurs, this will display the error
message. -->
<ERROR>
<FONT FACE="Verdana,Arial" SIZE="+1"><B>An Error Has Occurred</B></FONT><P>
<FONT FACE="Verdana,Arial" SIZE="-1"><B>Error Message =
:i_errortext</B></FONT><P>
<FONT FACE="Verdana,Arial" SIZE="-1"><B>database Error =
:i_databaseerrortext</B></FONT><P>
<FONT FACE="Verdana,Arial" SIZE="-1"><B>database Error =
:i_databaseerrorstmt</B></FONT><P>
</ERROR>
<REM --- Begin normal markup language here        --->
<markup language>
<HEAD>
<TITLE>Ticketing & Reservation System - Confirmation</TITLE>
</HEAD>
<BODY BACKGROUND="images/background.jpg" TEXT="#000000" LINK="#006666"
VLINK="#006666">
<REM --- Checks to see if the instance "reserve" with a value of   --->
<REM --- "receipt" is passed to this page. If so, the codes within --->
<REM --- the iCASE and /iCASE tags are executed. This is primarily --->
<REM --- for security purposes as the instanced "reserved" is only --->
<REM --- called in the step immediately before. If a visitor       --->
<REM --- accidentally stumbled upon this file, nothing will be run --->
<REM --- unless all previous steps are completed.                  --->
```

FIG. 5
(CONT.)

```
<iCASE ALIAS="reserve" VALUE="receipt">
<CENTER>
<TABLE BGCOLOR='#000000' BORDER=0 CELLPADDING=5 CELLSPACING=0
WIDTH=500>
<TR><TD>
<CENTER>
<FONT FACE='Verdana,Arial' SIZE=+1 COLOR='#FFFFFF'><B>
Concert Reservation System
</B></FONT>
</CENTER>
</TD></TR>
</TABLE>
</CENTER><p>
<REM --- Two steps are combined here:                  --->
<REM --- 1. The reservation information captured in    --->
<REM --- "reserve2.ihtml" is passed to the iPAY tag which   --->
<REM --- processes the information and passes it to CyberCash   --->
<REM --- for verification. If successful, the tag returns  --- >
<REM --- "success", otherwise it returns a variation of "fail"    --- >
<REM --- 2. iIF checks to see if the verification is a success or --- >
<REM --- failure. If successful, it will process the codes   --->
<REM --- immediately after it, which includes updating the   --->
<REM --- database with a successful reservation. If anything   --->
<REM --- other than "success" is returned, iIF will skip to   --->
<REM --- the iELSE tag and execute all codes thereafter.   --->
<iIF COND=<iPAY SERVER="C3"
                amount=:total
                id=:oid
                ccnum=":ccnum"
```

FIG. 5
(CONT.)

```
ccmexp=":ccmexp"
ccyexp=":ccyexp"
name=":name"
capture="false"
HOST="http://cr.cybercash.com/cgi-bin"
PORT=80
SECRET="vendorid-26"
CRYPTOKEY="j1y1o1ohNU1 ciTdPF1 hsvHFjlpnCpR"»
```
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1 WIDTH=500>
<TR><TD>
<FONT FACE="Verdana,Arial" SIZE="-1">
<B>The credit card has been approved and the reservation has been processed.<P>
The following are the Authorization Code and Receipt Number:</B><p>
<b>Authorization Code:</b> :i_pay_authnumber<BR>
<b>Receipt Number: </b> :ipay_transactionnumber<P>
<b>Customer Name:</b> :name<BR>
<b>Total Amount:</b> $:total<BR>
<b>Credit Card Number:</b> :ccnum<BR>
<b>Month of Expiration:</b> :ccmexp<BR>
<b>Year of Expiration:</b> :ccyexp<BR>
<REM --- Begin database query to update the "customers" table with customer information captured in "reserve2.ihtml".    --->
<Markup language DBNAME=:datasource
         database="UPDATE customers
         SET contact=':name', phone=':phone, email=':email'

FIG. 5 (CONT.)

```
                    WHERE id=:custid">
<REM --- Begin database query to update the "orders" table is updated with the approval
code returned by CyberCash, as well as the transaction information (total charge, credit
card number, etc).                              --->
<Markup language DBNAME=:datasource
            database="UPDATE orders
            SET approvalcode=':i_pay_authnumber',
receiptnum=':i_pay_transactionnumber', totalcharge=:total,cc=':ccnum', ccm=':ccmexp',
ccy=':ccyexp'
            WHERE id=:oid"
        FAILURE="The information was not saved correctly.<br>">
<REM --- Begin database query to turn off the availability of the seats that have been
reserved by setting the "active" attribute of the seats to "0".           --->
<database ALIAS="markoff" dbname=":datasource" database="SELECT pid FROM
orderdetail WHERE oid=:oid">
        <databaseFETCH ALIAS="markoff">
        <iWHILE NOTALIAS=i_databaseempty>
            <Markup language dbname=":datasource"
                database="UPDATE products
                SET active=0
                    WHERE id=:markoff_pid">
                <databaseFETCH ALIAS="markoff">
            </iWHILE ALIAS=i_databaseempty>
</database ALIAS="markoff">
</FONT>
</TD></TR>
</TABLE>
</TD></TR>
</TABLE>
```

FIG. 5 (CONT.)

```
</CENTER><p>
<iELSE>
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1
WIDTH=500>
<TR><TD>
<FONT FACE="Verdana,Arial" SIZE="-1"><B>
This transaction could not be processed by Cyber Cash at this time. Either the Credit Card
Information was invalid or the Cyber Cash server is currently not available.
</B></FONT>
</TD></TR>
</TABLE>
</TD></TR>
</TABLE>
</CENTER>
</iIF>
<FORM ACTION="index.ihtml" METHOD="post">
<CENTER>
<TABLE BGCOLOR='#000000' BORDER=0 CELLPADDING=0 CELLSPACING=0>
<TR><TD>
<TABLE BGCOLOR='#FFFFFF' BORDER=0 CELLPADDING=5 CELLSPACING=1
WIDTH=500>
<TR><TD>
<CENTER>
<FONT FACE="Verdana,Arial" SIZE="-1"><B>
<INPUT TYPE="submit" VALUE="Return to Concert Selection">
</B></FONT>
```

FIG. 5
(CONT.)

```
</CENTER>
</TD></TR>
</TABLE>
</TD></TR>
</TABLE>
</CENTER>
</FORM>
<FORM ACTION="http://domainname/filename" METHOD="post">
    <CENTER>
<TABLE BGCOLOR= 000000' BORDER=0 CELLPADDING=0 CELLSPACING=0> <TR><TD>
<TABLE BGCOLOR='#FFFFFF' BORDER=0 CELLPADDING=5 CELLSPACING=1
WIDTH=500>
<TR><TD>
<CENTER>
<FONT FACE="Verdana,Arial" SIZE="-1"><B>
<INPUT TYPE="submit" VALUE="Return to On-Line Ticketing & Reservation Front Desk">
</B></FONT></CENTER>
</TD></TR><TTABLE></TD></TR></TABLE></CENTER>
</FORM>
</CASE ALIAS="reserve")
</BODY>
</markup language>
```
which verifies and confirms payment information

FIG. 5 (CONT.)

SYSTEM AND METHOD FOR SELECTING AND RESERVING AIRLINE SEATS

CROSS REFERENCE TO RELATED APPLICATIONS

This application is a continuation of U.S. patent application Ser. No. 12/244,727 filed on Oct. 2, 2008, which is a continuation of U.S. patent application Ser. No. 09/295,577 filed on Apr. 22, 1999, now U.S. Pat. No. 7,454,361, the disclosures of which are hereby incorporated by reference in their entirety. This application is also related to co-pending U.S. patent application Ser. No. 12/479,601 filed on Jun. 5, 2009, the disclosure of which is hereby incorporated by reference in its entirety.

BACKGROUND

1. Field of the Invention

This invention relates to an electronic means by which people can select the exact seat or seats they want for any type of event or reserve an appointment for any activity such as a doctor or dentist appointment or even an appointment to have their car lubed. More specifically, a customer or a ticket re-seller or a venue operator can go, for example, to the internet and select the event or activity for which they want a ticket or tickets or reserve a time and reserve and order the exact seat or seats or the time of their choosing directly online. The seat or seats or reserved time they select is then removed from the inventory for that activity or event and made not available for any other buyer and such is so indicated by a graphical representation or other such indicator on the online map or picture representing availability of seating or time for that event. For an appointment reservation, the user connects to the internet or other wide area network, such as a bulletin board, from his home of office computer and connects to a page that displays a reservation calendar where he can interact such as to reserve a specific time period for himself.

In accordance with the present invention a remote location ticketing and reservation system for any venue comprises an internet or network compatible computer program constructed generally to afford access to a database, or other record maintained in electronic form, containing information about all sold and unsold seating for any specific venue or event and means and method by which a remote user, through use of a computer terminal or other such device, may access said database or other record and receive at his location through any computer terminal or other such device information about which specific seats remain available and then through a computer mouse or keyboard or other such input device select a specific seat or seats for that specific event and reserve such for himself for use during said event.

2. Prior Art

The inadequacies and inefficiencies of present ticketing and reservation systems are recognized and addressed through this invention. The rapid growth of the internet now makes it possible for anyone at his home or office to avail himself of the advantages of the instant invention through a simple internet or other wide area network connection.

Prior art makes a feeble attempt to address the inconvenience of ticket ordering. U.S. Pat. No. 5,797,126 (1988), Helbling, et al., describes a series of individual kiosks in wireless communication with a central station where a visitor can locate events of interest, view an excerpt of scenes from that venue and purchase tickets. This falls far short of the instant invention since it still requires a user to physically visit a remote site to avail himself of the service. Additionally, said prior art makes extensive use of what is called "kiosks" implying that, unlike the instant invention, it is only from his specialized machines that such services may be rendered.

U.S. Pat. No. 4,974,252 describes a more interactive theater attendance system where patrons are permitted two way communications between themselves and a broadcast center but this is still far from objectives of the instant invention and requires that persons be in attendance at the theater and, further some attendant be present at the remote broadcast center. The instant invention is fully automated and, other than the normal monitoring of any application for a wide area network, requires no human attendance or intervention.

U.S. Pat. No. 3,427,438 describes a ticket vending system where sales of tickets can be recorded on a seating layout but, again falls far short of the instantaneous update and automatic operation of the instant invention. U.S. Pat. No. 5,333,257 allows for a view from a seat but that is now common for internet applications where a hyperlink to any graphic is routinely provided and ancillary to and even unnecessary to the instant invention. Other prior art does nothing to make ticket ordering or seating reservations more readily available and does nothing to improve the information flow to prospective customers so that they may make a more informed decision about attending any given event.

Consider the traveler who has planned a vacation in, say, New York City and wants tickets for some Broadway show. Presently he has either to phone and accept someone else's definition of what constitutes "best available" or wait until he gets into town and seek out a scalper or reseller agency and he still isn't sure exactly what his seats offer.

OBJECTS AND ADVANTAGES

Several objects and advantages of the present invention are:

(a) to always provide customers with a seat selection comprised of the total of the then best available seats for any given event;

(b) to make equally available to all customers all then available seats for any given event to that said customer, so he may select for himself the seat or seats he wants for that event;

(c) to provide an alternative means to visiting box office or a ticket reseller for a customer to select and reserve for himself the then best available seat or seats for any arena, stadium, theater, airline flight or any other such venue where seating is available;

(d) to provide to a ticket sensitive venue operator better control over the seating and seat availability for the various events he offers;

(e) to provide to a ticket sensitive venue operator better accounting of his seating for the various events he offers;

(f) to provide to the general public a more cost effective means by which he may reserve and buy tickets for any given event;

(g) to provide to a venue operator a more cost effective means by which he may sell tickets for any given event;

(h) to provide to the general public an automated 24 hours a day, seven days a week means by which he may reserve and purchase the specific seats he wants for an event;

(i) to provide to a venue operator an automated 24 hours a day, seven days a week means by which he may offer reservation and purchase of a seat or seats that are individually selectable by a customer;

(j) to permit the venue operator to avoid overbooking an event;

(k) to permit the venue operator to avoid underbooking an event;

(l) to permit a doctor or other professional for whom his time is a commodity to better schedule and regulate his time and interact with patients or others in the online environment;

(m) to provide to the general public a 24 hours a day, seven days a week means by which they may schedule appointments with doctors, dentists, automotive mechanics and the like with full knowledge that the appointment time they select is still available.

Further objects and advantages are to provide any venue operator the benefit of better control over his ticket inventory and sales such as to improve his profitability and the efficiency of his operation and to provide to the general ticket buying public better information and an easier means by which they may acquire their desired ticket or tickets for any event.

SUMMARY OF THE INVENTION

The ticketing and reservation system of the present invention, in one particular embodiment thereof, includes a computer program operating on a server for a wide area network (WAN), generally described by the flow chart of FIG. 1 and the accompanying code example which implements the instant invention in practice:

First, when a user accesses the system means is provided to initialize the process and return to the user a menu from which he selects his venue of interest. This can be a selectable menu arranged by artist or date or time or specific theater or football team or baseball team or name or activity or any combination thereof such that the user is given sufficient information from which to make a decision. An example would be someone looking for the next event at a given theater at a time that starts at 7:00 pm. One of many possible series of computer instructions to perform this function is:

Send database query to retrieve all venues that are currently available in the system
    Server receives and processes query
    Query is looped until all available performances and venues are retrieved->
    Markup Language engine converts result to display compatible format for output to client computer
    Begin normal markup language here
    Begin reservation process selecting the event date/time next to the desired venue THEN, upon user submittal, the server initializes the process of returning to the user all available seats:

Send database query to retrieve all seats that are currently available in the system for this event
    Server receives and processes query
    Query is looped until all available seats are retrieved
    Markup language engine converts result to markup language format for output to client computer
    Begin normal markup language here
    Continue reservation process by selecting the desired seat or seats THEN, upon user submittal we create a new customer record in the Wide Area Network server and tell the system which database to connect to to fulfill the user's request(s):

Send database command to insert new record in customer database and obtain record id
    Send database command to insert new record in reservation "order" database and obtain record id
    Send database command to insert new record for each selected seat in the reservation "detail" database
    Begin normal markup language here
    Continue reservation process by requesting client payment information THEN, upon user submittal the information is passed for verification:

Submit client information for verification
    If verification is successful, send database command to update customer record in customer database with information previously collected
    If verification is successful, send database command to update reservation record in reservation "order" database with verification information
    If verification is successful, send database command to remove selected seats from seat inventory database and mark as no longer available for future selection
    Markup language engine converts result to markup language format for output to client computer
    Begin normal markup language here
    If verification is successful, confirmation is generated via Markup language engine to markup language format for output to client computer
    If verification is unsuccessful, a failure notice is generated via Markup language engine to markup language format for output to client computer
    If verification is unsuccessful, client is presented with option to provide his payment information again or abandon his reservation While this is one preferred form of the code there are many other code sequences that will perform the same function that will be immediately obvious to one skilled in the art.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which:

FIGS. 3A and 3B are illustrations of the concept of the present invention refined down to the functionality of reserving specific seats and blocking duplicate sale of those seats that are already reserved.

FIG. 5 is a complete code set for one preferred embodiment of the present invention.

DETAILED DESCRIPTION OF THE PREFERRED EMBODIMENT

Figure 1:
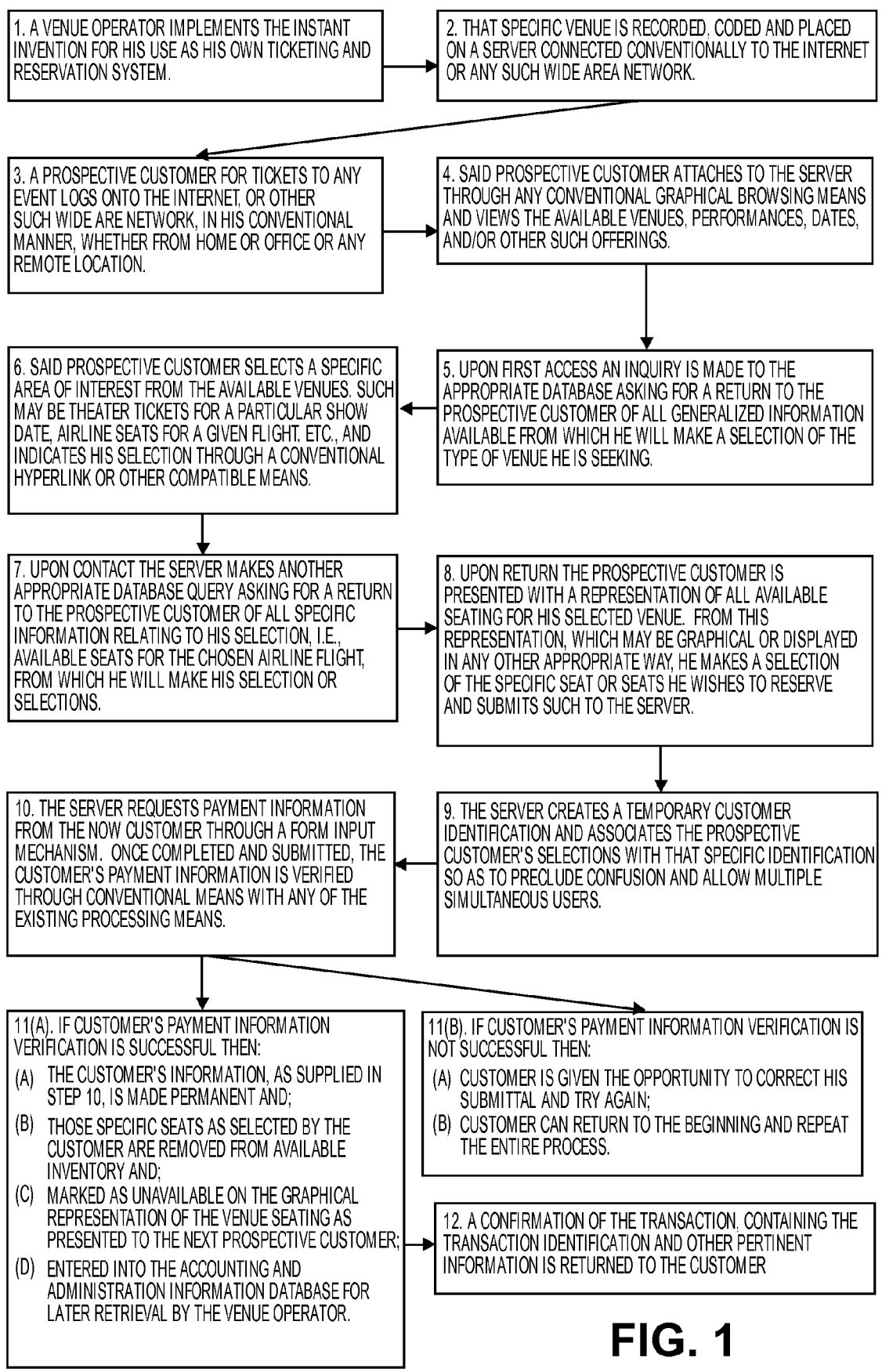
FIG. 1 is a block diagram of the present invention illustrating the major components thereof and the interactivity that takes place between the potential customer and the instant invention.

Referring to FIG. 1, it will be seen that the operator of a venue implements the instant invention for purposes of allowing remotely located users to reserve specific seating for specific events 1. By doing so, he initiates those certain actions necessary to display an internet web site to all online users 2. A prospective customer for the venues offering(s) logs onto the internet 3 and acquires the aforesaid internet web site 4 which implements the instant invention. He can be connected to the internet by any conventional means yet this by no means implies that the wide area network must be what is commonly referred to as the "internet." Upon first contact by the prospective customer, an inquiry is directed to the appropriate database, which may be located concurrent with the primary server hosting the program for the instant invention or may be located remotely, such as at the physical location of the venue, asking for a return of information to the prospective customer of all appropriate information contained therein relative to his inquiry 5. The prospective customer indicates his desired seat or seats through conventional computer input means and directs that information back to the server hosting the code necessary to the implementation of the instant invention 6. Upon contact 7 the server again makes an appropriate database query and returns to the prospective customer all pertinent information relating to his selection, such as which seats are still available for the chosen performance, airline flight, boxing match, etc. The prospective customer is then presented with a representation of all then available seating for his selected venue 8. From this representation, the prospective customer makes his selection of a seat or seats by indicating such through a mouse click, keyboard entry or other means, such as but not limited to a touch screen. Simultaneously, the server, through the coding necessary to implement the instant invention, creates a temporary customer identification 9 that is used to associate this potential customer with this later selection and permit system use by multiple simultaneous users. Once the customer has made his seat selection he is asked for payment information 10. That information is processed through conventional internet or other electronic means and once the information and payment are verified 11a the customer information, as supplied in 10, is made permanent and the seat or seats he has selected are removed from inventory and blocked from duplicate sale, both graphically when presented to the next prospective customer and in the database where information for accounting and administrative purposes is retained. If the customer's payment information cannot be verified 11b then he is given an opportunity to correct the information or start over with a new transaction. Upon verification of the customer's payment information he receives a confirmation of the transaction 13 containing all appropriate reference information for his records.

Figure 2:
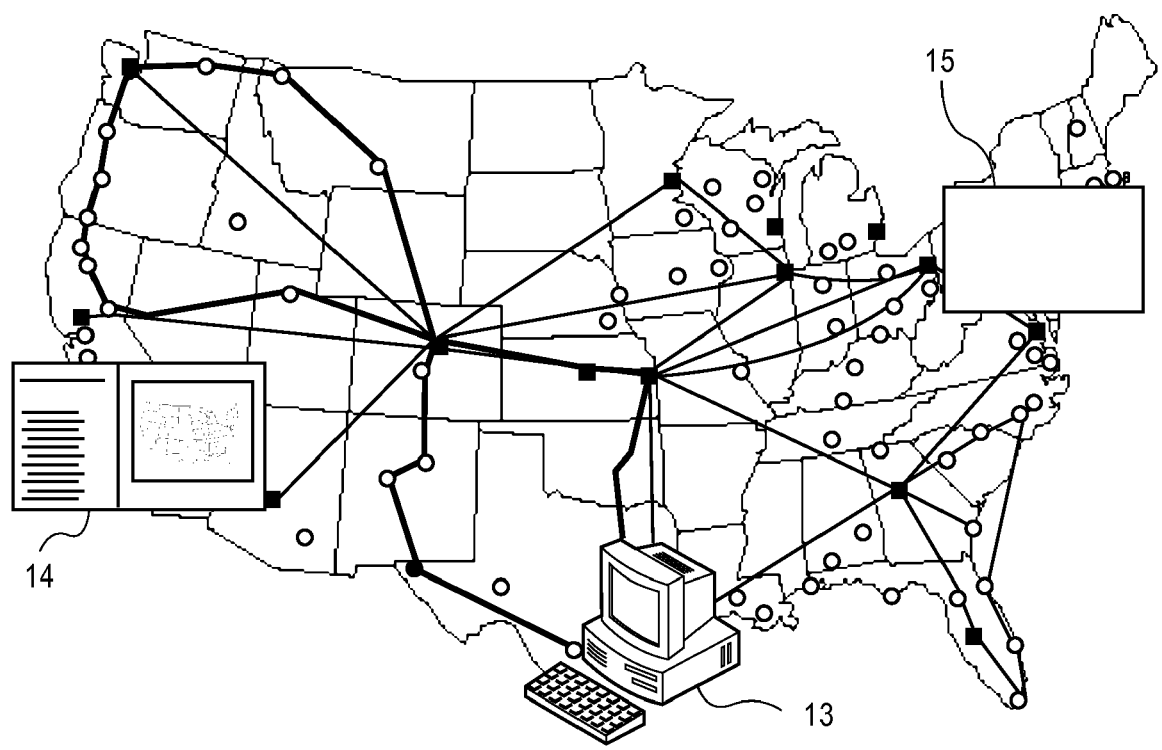
FIG. 2 is an illustration of the concept of the present invention utilizing the internet as the Wide Area Network to which users connect to perform the desired function and shows an example of a remotely located user accessing the functionality of the instant invention for purposes of reserving seats for a dinner theater performance in a distant city.

Referring to FIG. 2, it will be seen that, for example, a user in Houston 13 is planning to vacation in New York and wishes to see a play at a dinner theater there that utilizes the present invention for ticketing and reservations 15. The user in Houston, or in any other location worldwide, connects to the internet in the conventional way and retrieves the appropriate web site through his graphical browser from a server located in, say, Anaheim, Calif. 14. Through implementation of the instant invention the user is able to see the exact seating arrangement of the remote dinner theater and select the exact seat or seats he wants for the performance of his choice. Such additional information as is appropriate can be provided to the remote user to assist him in making an informed decision as to which seat or seats he wishes to occupy for this performance.

Figure 3B:
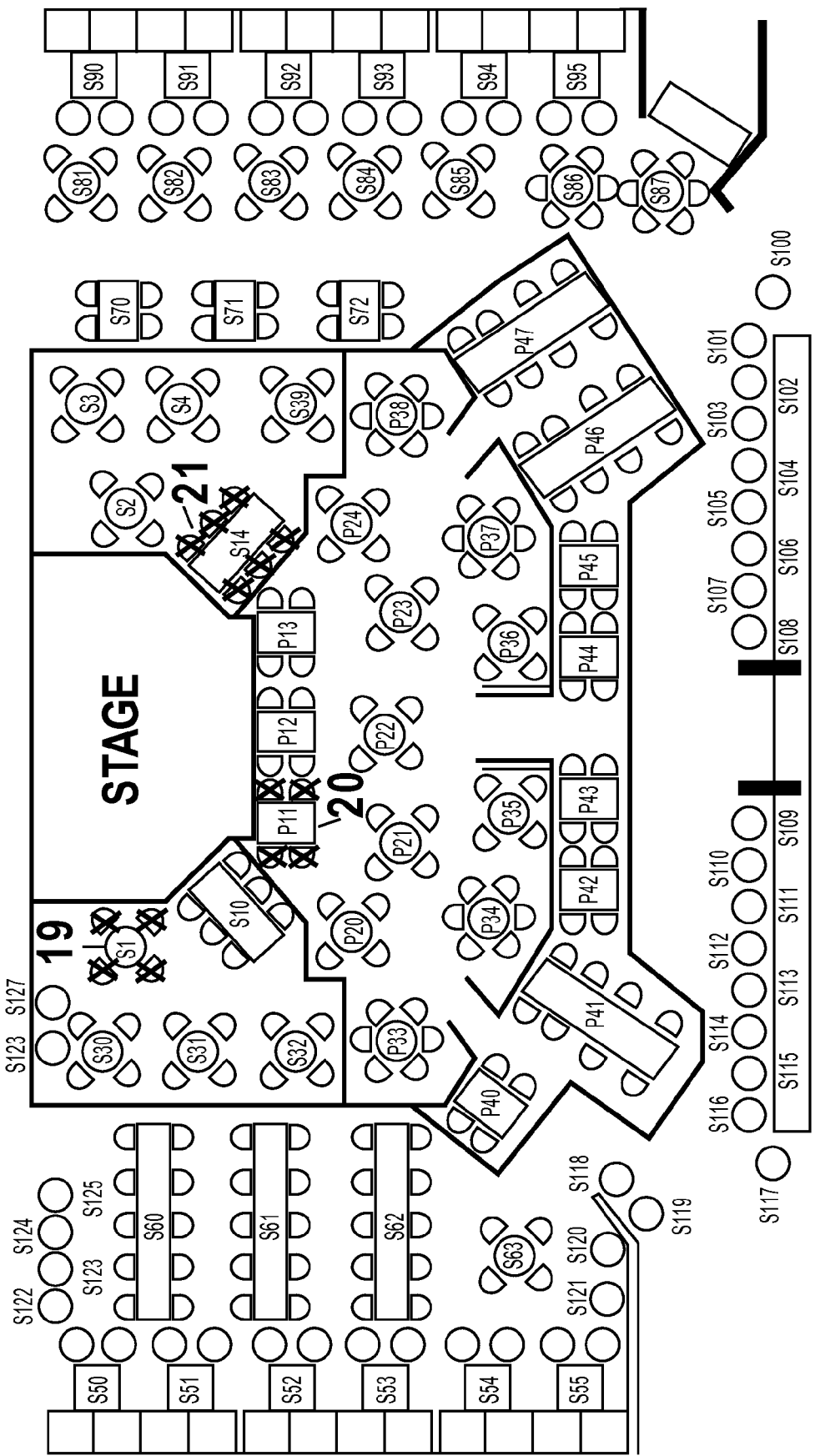

Referring to FIGS. 3A and 3B, it will be seen that in FIG. 3A that, at the user selected venue, all seats at table P11 17 and at table S14 18 have been previously taken and are so indicated by the graphical representation of an "X" over those seats. Our potential customer wants to seat a party of four at table S1 16 and so indicates by clicking his mouse on those four seats or by so indicating through an alternative standard computer input means. Once his payment method is verified his selected seats are removed from inventory and so indicated on the graphical representation by placing an "X" over those seats 19 while retaining the "X" over those seats previously sold at table P11 20 and table S14 21. The next prospective customer is advised that these seats are no longer available for this performance by the new graphical representation shown in FIG. 3B that is his first viewing screen upon entry into the system. In the event that two prospective customers wish to reserve the exact same seat or seats, that prospective customer who first receives validation of his payment method is given those seats while the other prospective customer is notified that while making his decision the seats he wants have already been sold and offers him a chance to select other seating.

Figure 4A:
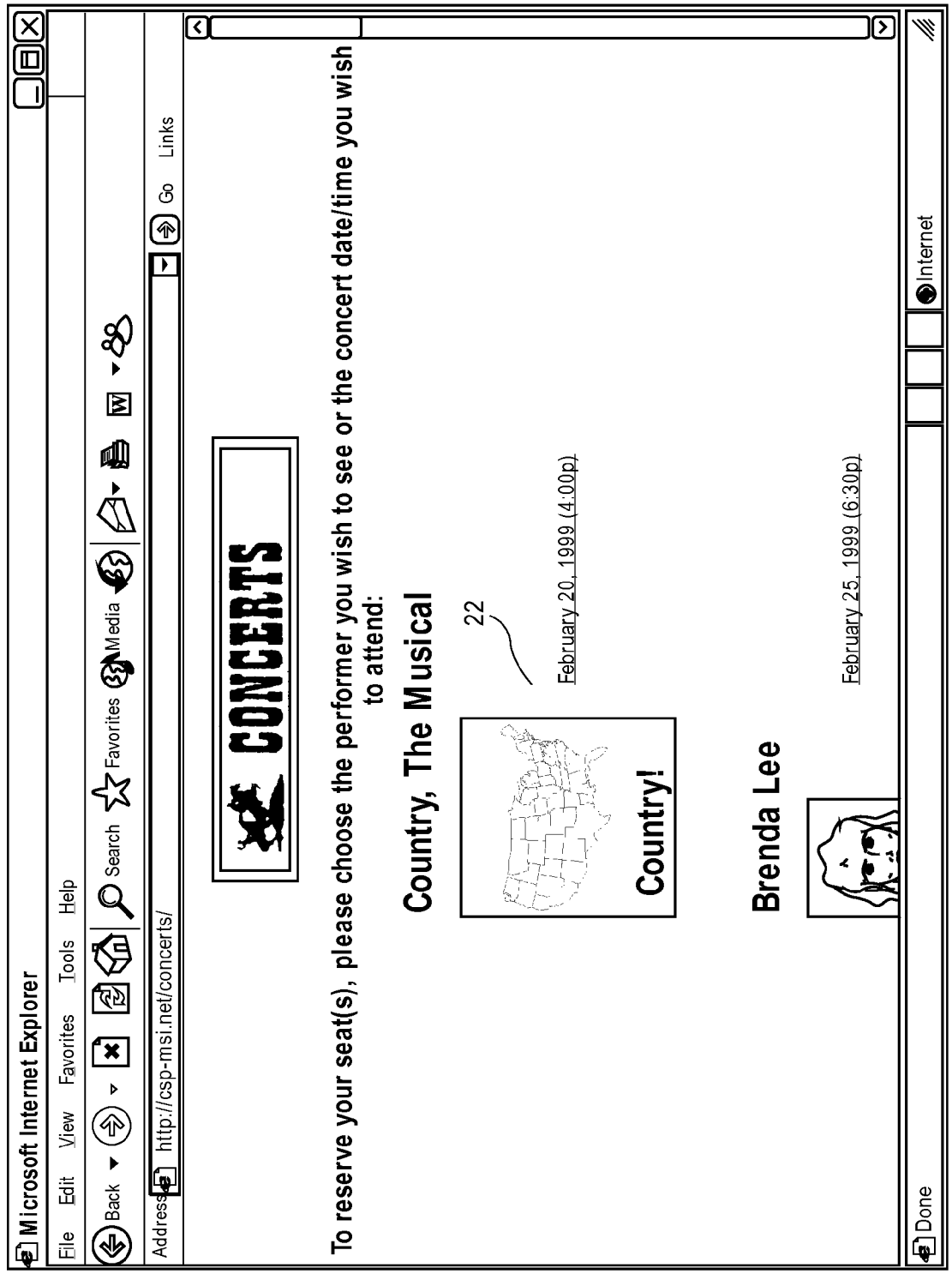
FIGS. 4A to 4E are sample screens seen by a remote user of the instant invention during a session wherein he selects and orders four specific seats for a distant dinner theater show.
Figure 4B:
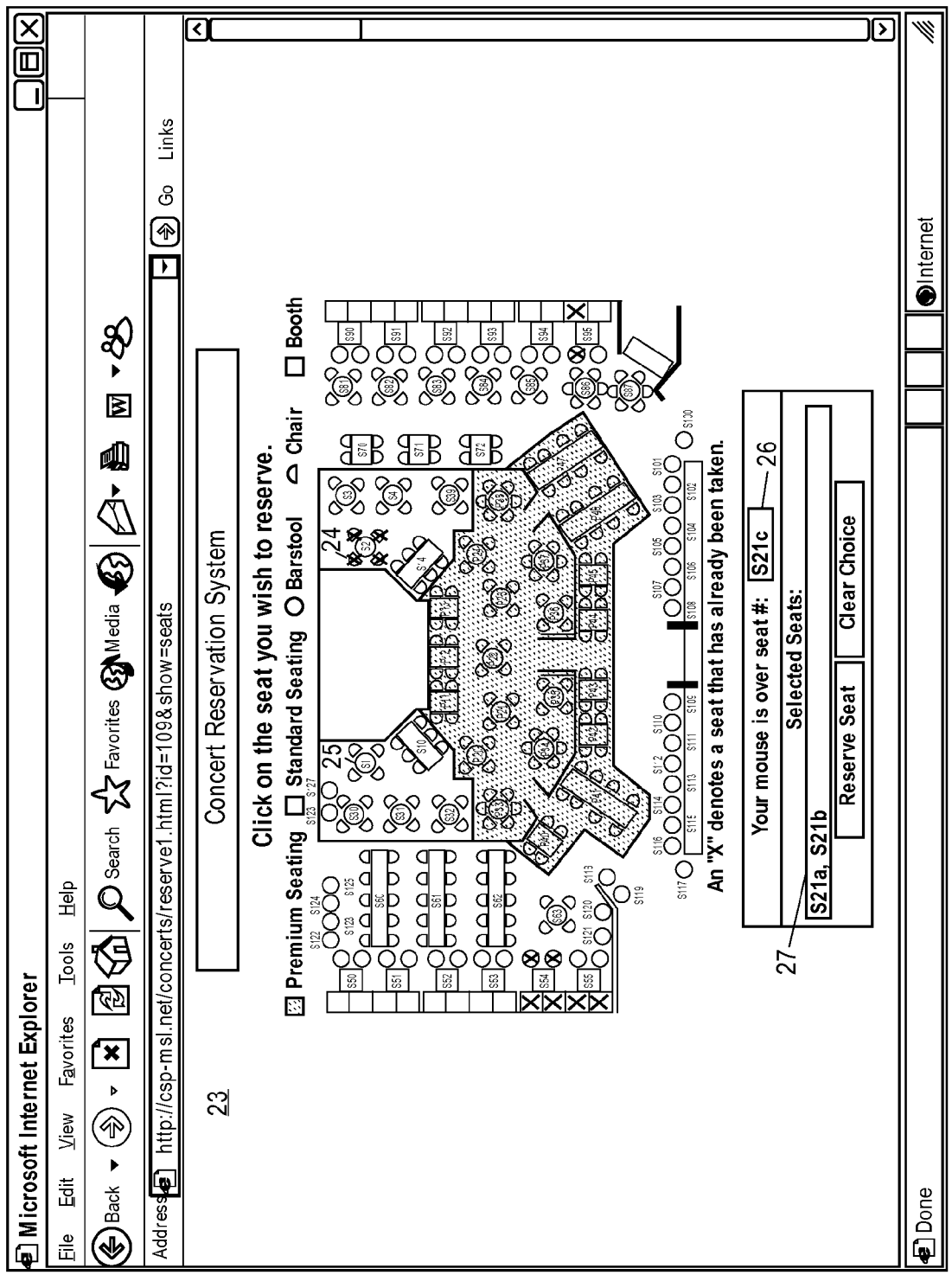
Figure 4C:
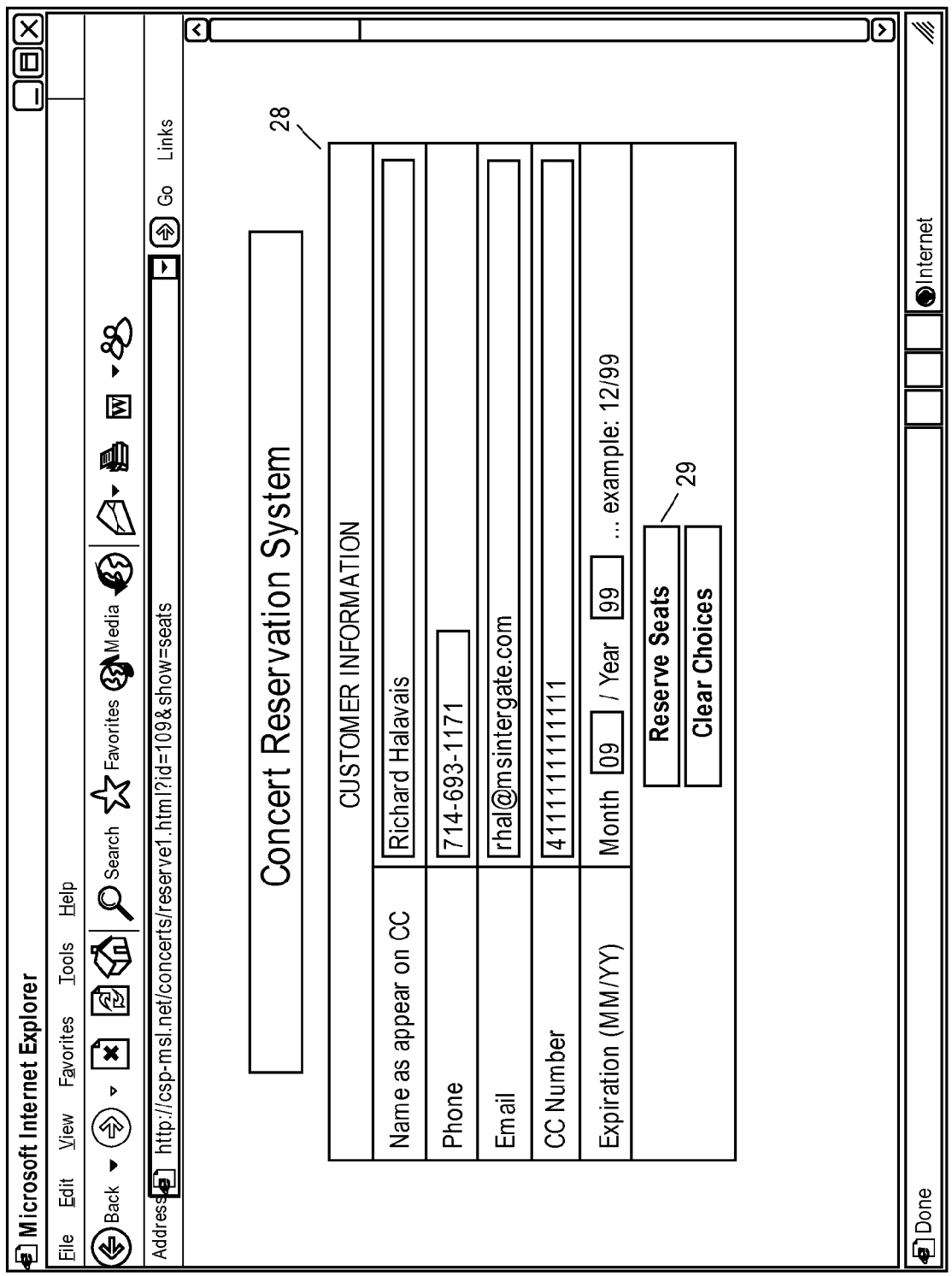
Figure 4D:
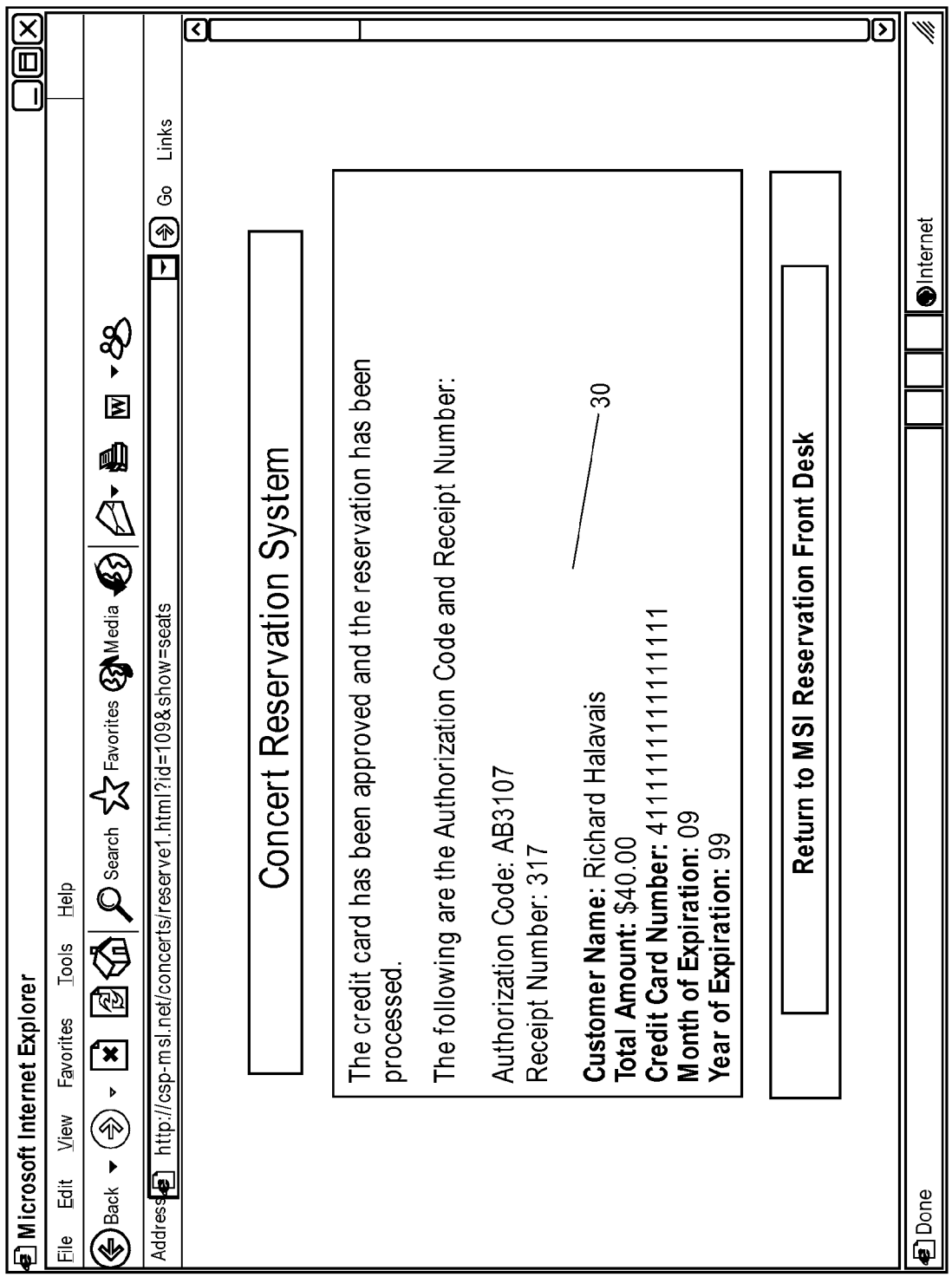
Figure 4E:
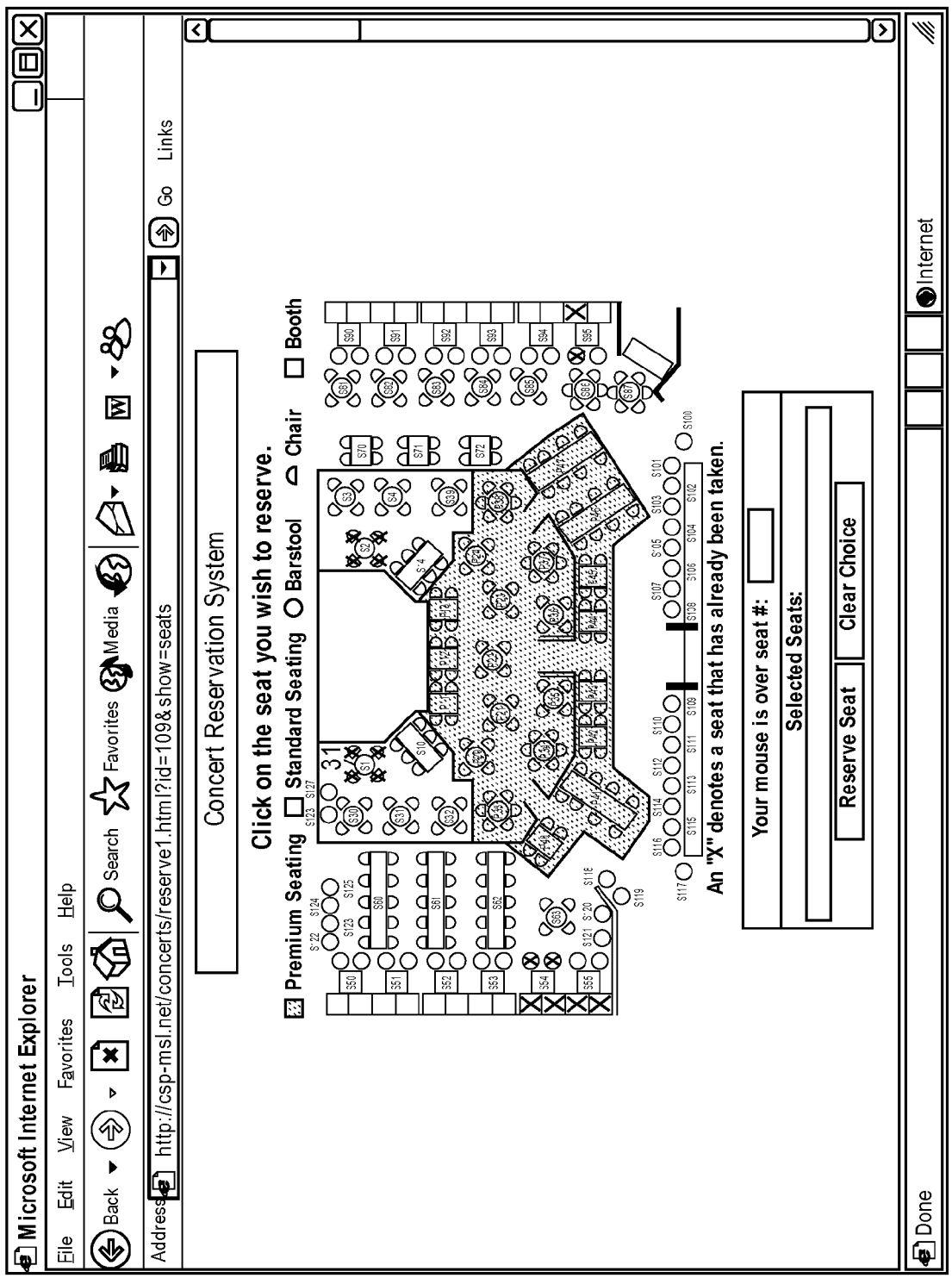

Referring to FIGS. 4A to 4E, one will see the screens presented to a user when he accesses the system and as he progresses through the process of selecting a specific seat or seats, then reserves and pays for them. FIG. 4A is where the first screen presented shows links to available performances for that selected venue 22. FIG. 4B is the second screen 23 and shows a view of the seating available for that venue with seats that have already been taken crossed off with an "X" 24. Our hypothetical user decides that he would like to have his party of four sit at table S11 25 and selects the four seats around that table by clicking on them with his mouse. As he moves his mouse over individual seats the seat number appears in the window at the bottom of his screen 26 and when he clicks on a seat it is added to a running tally of the seats he has already taken 27. Only seats that have not previously been taken show up in the mouse-over window 26. After completing his selections the user clicks on the "Reserve Seats" button and FIG. 4C shows his next screen, which asks him for his payment information 28. He enters the required information and again clicks the "Reserve Seats" button 29. FIG. 4D is the next screen and it tells him that his payment method has been accepted (or rejected) and relates information about the transaction 30 such as his transaction code and the receipt number that he can use as a ticket or as a voucher with which to redeem his ticket or tickets at the venue box office when he arrives for the performance. Finally, FIG. 4E shows the opening screen the next visitor to the system is presented with the same set of screens except that the seats reserved by our hypothetical user 31 are marked off as already taken.

Referring to FIG. 5, one will see one of many possible coding schemes making possible the results of the present invention.

Those having skill in the art to which the present invention pertains will now understand that there are virtually unlimited uses for the present invention. By way of example, the present invention may be readily used to reserve specific seats on commercial airliners or reserve specific staterooms on a cruise ship, as well as for reserving seats for any venue from community theater or little league baseball to major league sporting events.

The present invention has been described in sufficient detail to enable one skilled in the art to make and use the invention. Accordingly, specific details which are readily available in the art or otherwise conventional have been omitted to prevent obfuscation of the essential features of the invention.

In view of the foregoing it will be understood that the present invention may be implemented in a variety of alternative methods but that all such implementations are deemed to be within the scope of the present invention which is to be limited only by the claims appended hereto:

What is claimed is:

1. A computer-implemented method for interactively selecting one or more seats on a flight by an end user over a network, the method comprising:
receiving over the network from a general purpose computer first data representing payment information;
transmitting second data to an application running on the general purpose computer, the second data including information descriptive of available individual seats on one or more flights, the second data encoded to cause the application to generate a graphical user interface on the general purpose computer that comprises an interactive seating map representing individual seats on the one or more flights, the second data encoded to cause the application to generate an additional display of information about selection of seats in response to the end user placing a mouse indicator over a portion of the interactive seating map; and receiving from the general purpose computer third data representing one or more seats selected by one or more mouse clicks.

2. The method of claim 1 further comprising:
transmitting fourth data to the application, the fourth data including information that can be printed as an admission document or voucher by the end user.

3. The method of claim 1, wherein transmitting the second data to the application running on the general purpose computer comprises transmitting web page data for generating the interactive seating map.

4. The method of claim 3, wherein transmitting the web page data for generating the interactive seating map comprises transmitting embedded scripting language code for generating the interactive seating map.

5. The method of claim 1, wherein the second data is capable of causing the application to display a location of the one or more of the individual seats in response to the end user placing a mouse indicator over a portion of the interactive seating map.

6. The method of claim 1, wherein the second data is capable of causing the application to display a seat number in response to the end user placing a mouse indicator over a portion of the interactive seating map.

7. The method of claim 1, wherein the second data is capable of causing the application to display a seat number in response to the user placing a mouse over a portion of the interactive seating map corresponding to an individual seat.

8. A system for interactively selecting one or more seats on an airplane by a plurality of end users over a network, the system comprising:
a data storage system storing a plurality of entries denoting a plurality of available individual seats on one or more airplanes; and
a server, programmed via executable instructions to:
query the data storage system for information descriptive of available individual seats on one or more airplanes;
receive over the network from a general purpose computer first data representing payment information;
transmit second data to an application running on the general purpose computer, the second data including the information descriptive of available individual seats on one or more airplanes, the second data encoded to cause the application to generate a graphical user interface on the general purpose computer that comprises an interactive seating map representing individual seats on the one or more airplanes, the second data encoded to cause the application to generate an additional display of information about selection of seats in response to a user interaction with the graphical user interface, the additional display being triggered when placing a mouse indicator over a portion of the interactive seating map; and
receive from the general purpose computer third data representing one or more seats selected by one or more mouse clicks.

9. The system of claim 8, wherein the server is further configured to transmit fourth data to the application, the fourth data including information that can be printed as an admission document or voucher by the end user.

10. The system of claim 8, wherein the server is programmed to transmit said second data as web page data for generating the interactive seating map.

11. The system of claim 10, wherein the server is programmed to transmit said web page data with embedded scripting language code.

12. The system of claim 8, wherein the second data is adapted to be processed by the application to cause the application to display information about a location of the seat in response to the user interaction.

13. The system of claim 8, wherein the second data is configured to be processed by the application to cause the application to display a seat number in response to the user interaction.

14. The system of claim 8, wherein the second data is configured to be processed by the application to cause the application to display a seat number in response to the user placing a mouse over a portion of the interactive seating map corresponding to an individual seat.

15. A computer-implemented method performed by a general purpose computer for interactively selecting one or more tickets to seats on an airplane by an end user over a network, the method comprising:
receiving payment information;
receiving, via an application running on the general purpose computer from a server coupled to the general purpose computer over the network, data including information descriptive of available individual seats on one or more airplanes, the data processed by the application to generate a graphical user interface on the general purpose computer that comprises an interactive seating map representing individual seats on the one or more airplanes, the data processed by the application to generate an additional display of information about selection of seats in response to a mouse indicator being positioned over a portion of the interactive seating map; and
receiving from the end user a selection of one or more seats selected by one or more mouse clicks.

16. The method of claim 15, further comprising:
receiving form the server information that can be printed as an admission document or voucher by the end user.

17. The method of claim 15, wherein receiving, via an application running on the general purpose computer from a server coupled to the general purpose computer via network, comprises receiving web page data for generating the interactive seating map.

18. The method of claim 17, wherein receiving, via an application running on the general purpose computer from a server coupled to the general purpose computer via network, comprises receiving embedded scripting language code for generating the interactive seating map.

19. The method of claim 15, wherein the additional display of information comprises information about a location of the seat in response to the mouse indicator being positioned over the portion of the interactive seating map.

20. The method of claim 15, wherein the additional display of information comprises a seat number in response to the mouse indicator being positioned over the portion of the interactive seating map.

* * * * *

UNITED STATES PATENT AND TRADEMARK OFFICE
CERTIFICATE OF CORRECTION

PATENT NO. : 7,660,729 B2
APPLICATION NO. : 12/491171
DATED : February 9, 2010
INVENTOR(S) : Halavais et al.

It is certified that error appears in the above-identified patent and that said Letters Patent is hereby corrected as shown below:

In Figure 5, sheet 12 of 30, at line 7, change "<'TABLE>" to --</TABLE>--.

In Figure 5, sheet 13 of 30, at line 2, change "a input" to --an input--.

In Figure 5, sheet 13 of 30, at line 16, change ""+idnurn+"," to --"+idnum+",--.

In Figure 5, sheet 14 of 30, at line 4, change "old," to --oid,--.

In Figure 5, sheet 15 of 30, at line 22, change "corrds," to --coords,--.

In Figure 5, sheet 18 of 30, at line 13, change ""resevel.ihtml"" to --"reserve1.ihtml"--.

In Figure 5, sheet 19 of 30, at line 14, change ""reserve2.ihtmr>" to --"reserve2.ihtml">--.

In Figure 5, sheet 19 of 30, at line 15, change ""resevel.ihtml"" to --"reserve1.ihtml"--.

In Figure 5, sheet 19 of 30, at line 28, change "conbines" to --combines--.

In Figure 5, sheet 22 of 30, at line 22, change "ip and" to --ip is--.

In Figure 5, sheet 22 of 30, at line 23, change "attrieval" to --retrieval--.

In Figure 5, sheet 23 of 30, at line 13, change ""resere3.ihtml"." to --"reserve3.ihtml".--.

In Figure 5, sheet 23 of 30, at line 21, change ""resere3.ihtml" to --"reserve3.ihtml"--.

In Figure 5, sheet 27 of 30, at line 19, change ":ipay_" to --:i_pay_--.

In column 3, at line 34, change "Send" to --<-Send--.

In column 3, at line 35, change "system" to --system->--.

In column 3, at line 36, change "Server" to --<-Server--.

In column 3, at line 36, change "query" to --query->--.

In column 3, at line 37, change "Query" to --<-Query--.

In column 3, at line 40, change "Markup" to --<-Markup--.

In column 3, at line 41, change "computer" to --computer->--.

Signed and Sealed this

Twenty-seventh Day of July, 2010

David J. Kappos
*Director of the United States Patent and Trademark Office*

CERTIFICATE OF CORRECTION (continued)
U.S. Pat. No. 7,660,729 B2

In column 3, at line 42, change "Begin" to --<-Begin--.
In column 3, at line 42, change "here" to --here->--.
In column 3, at line 43, change "Begin" to --<-Begin--.
In column 3, at line 44, change "venue" to --venue->--.
In column 3, at line 47, change "Send" to --<-Send--.
In column 3, at line 48, change "event" to --event->--.
In column 3, at line 49, change "Server" to --<-Server--.
In column 3, at line 49, change "query" to --query->--.
In column 3, at line 50, change "Query" to --<-Query--.
In column 3, at line 50, change "retrieved" to --retrieved->--.
In column 3, at line 51, change "Markup" to --<-Markup--.
In column 3, at line 52, change "computer" to --computer->--.
In column 3, at line 54, change "Begin" to --<-Begin--.
In column 3, at line 54, change "here" to --here->--.
In column 3, at line 55, change "Continue" to --<-Continue--.
In column 3, at line 56, change "seats" to --seats->--.
In column 3, at line 61, change "Send" to --<-Send--.
In column 3, at line 62, change "id" to --id->--.
In column 3, at line 63, change "Send" to --<-Send--.
In column 3, at line 64, change "id" to --id->--.
In column 3, at line 65, change "Send" to --<-Send--.
In column 3, at line 66, change "database" to --database->--.
In column 3, at line 67, change "Begin" to --<-Begin--.
In column 3, at line 67, change "here" to --here->--.
In column 4, at line 1, change "Continue" to --<-Continue--.
In column 4, at line 2, change "information" to --information->--.
In column 4, at line 6, change "Submit" to --<-Submit--.
In column 4, at line 6, change "verification" to --verification->--.
In column 4, at line 7, change "If" to --<-If--.
In column 4, at line 9, change "collected" to --collected->--.
In column 4, at line 10, change "If" to --<-If--.
In column 4, at line 12, change "information" to --information->--.

CERTIFICATE OF CORRECTION (continued)
U.S. Pat. No. 7,660,729 B2

In column 4, at line 13, change "If" to --<-If--.

In column 4, at line 15, change "selection" to --selection->--.

In column 4, at line 16, change "Markup" to --<-Markup--.

In column 4, at line 17, change "computer" to --computer->--.

In column 4, at line 18, change "Begin" to --<-Begin--.

In column 4, at line 18, change "here" to --here->--.

In column 4, at line 19, change "If" to --<-If--.

In column 4, at line 21, change "computer" to --computer->--.

In column 4, at line 22, change "If" to --<-If--.

In column 4, at line 23, change "computer" to --computer->--.

In column 4, at line 25, change "If" to --<-If--.

In column 4, at line 27, change "reservation" to --reservation->--.

In column 6, at line 19, change "S11" to --S1--.